(12) United States Patent
Ponnuswamy et al.

(10) Patent No.: US 11,108,540 B2
(45) Date of Patent: Aug. 31, 2021

(54) SECURING CLUSTER COMMUNICATIONS IN A NON-SECURE NETWORK

(71) Applicant: EMC IP Holding Company, LLC, Hopkinton, MA (US)

(72) Inventors: Senthilkumar Ponnuswamy, San Jose, CA (US); Anjali Anjali, Punjab (IN); Satish Inampudi, Hyderabad (IN); Rekha Sampath, Saratoga, CA (US); Amei Xu, Santa Clara, CA (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 355 days.

(21) Appl. No.: 16/252,052

(22) Filed: Jan. 18, 2019

(65) Prior Publication Data

US 2020/0235907 A1    Jul. 23, 2020

(51) Int. Cl.
```
G06F 21/45      (2013.01)
G06F 21/42      (2013.01)
H04L 9/00       (2006.01)
H04L 9/08       (2006.01)
G06F 9/455      (2018.01)
G06F 21/62      (2013.01)
H04L 9/12       (2006.01)
```
(52) U.S. Cl.
CPC .......... H04L 9/006 (2013.01); G06F 9/45558 (2013.01); H04L 9/085 (2013.01); H04L 9/0825 (2013.01); *G06F 2009/45587* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 2013/0290694 A1* | 10/2013 | Civilini | H04L 41/0806 713/2 |
| 2014/0059379 A1* | 2/2014 | Ren | G06F 11/2069 714/15 |
| 2016/0267013 A1* | 9/2016 | Van De Ven | G06F 8/54 |
| 2017/0214570 A1* | 7/2017 | Holen | G06F 13/4022 |
| 2018/0136962 A1* | 5/2018 | Kammampati | G06F 9/4843 |

OTHER PUBLICATIONS

CN 110334531. English Translation. Yang (Year: 2019).*

(Continued)

*Primary Examiner* — Venkat Perungavoor
(74) *Attorney, Agent, or Firm* — Barry N. Young

(57) ABSTRACT

Secure communications are established in a non-secure environment between virtual machines configured as nodes of a virtual machine cluster having a virtual scale-out architecture without user intervention. When a new virtual cluster node is automatically and dynamically created and deployed by a virtual cluster master node, the master node embeds in a common image from which the new node is created an initial secret key for establishing initial trusted communications between the new node and the master node. The master node then passes a permanent secret key to the new node, opens an OpenSSL connection for creating a public key infrastructure, and signs the new node's CSR with its own public and private keys and sends the signed certificate to the new node.

19 Claims, 3 Drawing Sheets

(56) References Cited

OTHER PUBLICATIONS

SPLM: Security Protection of Live Virtual Machine Migration in Cloud Computing. Sun. ACM, (Year: 2016).*
Trusted Virtual Machine Management for Virtualization in Critical Environments. Wahid. BCS. (Year: 2013).*
An Improved vTPM Migration Protocol Based Trusted Channel. Wan. IEEE. (Year: 2012).*
A Quantitative Security Metric Model for Security Controls: Secure Virtual Machine Migration Protocol as Target of Assessment. Zeb. China Communications. (Year: 2018).*

* cited by examiner

SECURING CLUSTER COMMUNICATIONS IN A NON-SECURE NETWORK

BACKGROUND

This invention relates generally to cluster communications, and more particularly to establishing secure communications between cluster nodes in a non-secure environment.

Enterprises that engage in large-scale services such as big data processing and computing can benefit from redundancy and improved performance by geographically distributing data centers and by distributing processing across multiple instances of the same application, particularly where processing demand is dynamically variable. As demand increases, it is beneficial to increase the number of application instances. A convenient and efficient way to achieve this is to employ an architecture known as virtual scale out (VSO) comprising a group or cluster of identical, load balanced virtual machines (VMs) referred to as a scale set which are connected in a network. The number of VM instances can automatically increase or decrease in response to demand or to a pre-defined set of conditions. When many VMs run the same application, it's important to maintain a consistent configuration across the environment by using identical VMs. For reliable performance, the VM size, disk configuration, and application installs should match across all VMs. Scale sets achieve this since all VM instances are identical, being created from the same base operating system (OS) image and having the same configuration and properties. Scale sets, thus, afford easy management of hundreds of VMs without additional configuration tasks or network management. Rules can be created to automatically increase or decrease the capacity of a scale set according to demand or to a predetermined schedule.

Frequently VMs of a cluster are distributed in a non-secure environment, such as a cloud, and are connected in a non-secure network. Many enterprises need to maintain their data secure, and thus, are required to encrypt their VM's data processing and communications. As a result, they must insure that any VMs that are deployed dynamically in a cluster by a virtual scale-out mechanism can be done so securely and instantiated with appropriate encryption keys to enable secure communications over a non-secure network. Deploying and instantiating securely and efficiently automatically and dynamically created VMs in a VSO without the necessity of user involvement is a difficult problem since encryption keys cannot be sent in the clear (unprotected) over a non-secure communications network path.

It is desirable to provide methods and systems that address and solve the foregoing problem such that VMs can be automatically, dynamically and securely deployed and instantiated a cluster in a non-secure environment without the necessity of user or administrator involvement, and it is to these ends that this invention is directed.

BRIEF DESCRIPTION OF THE DRAWINGS

FIG. 2 comprising

DESCRIPTION OF PREFERRED EMBODIMENTS

This invention is particularly well adapted for use in securing cluster communications in a non-secure network with virtual machines VMs that are automatically and dynamically created, and that can be deployed and instantiated securely in a virtual scale out (VSO) distributed data processing arrangement without the necessity of user or administrator involvement. It will be described in that context. However, as will become apparent, this is illustrative of only one utility of the invention, and it may be employed effectively with other types distributed processing arrangements where secure processing nodes are connected by a non-secure network or communications path.

As used in this disclosure, the following abbreviations have the following indicated meanings:

"CA" refers to a certificate authority; "CSR" refers to a certificate signing request; "OVF" refers to Open Virtualization Format; "PKI" refers public key infrastructure; "PSK" refers to pre-shared secret; "SSL" refers to Secure Sockets Layer; "TLS" refers to Transport Layer Security; "VCF" refers to a virtual cluster file system, i.e., a cluster node; "VCM" refers to a virtual cluster manager; "VM" refers to a virtual machine; "VSO" refers to virtual scale out.

Figure 1:
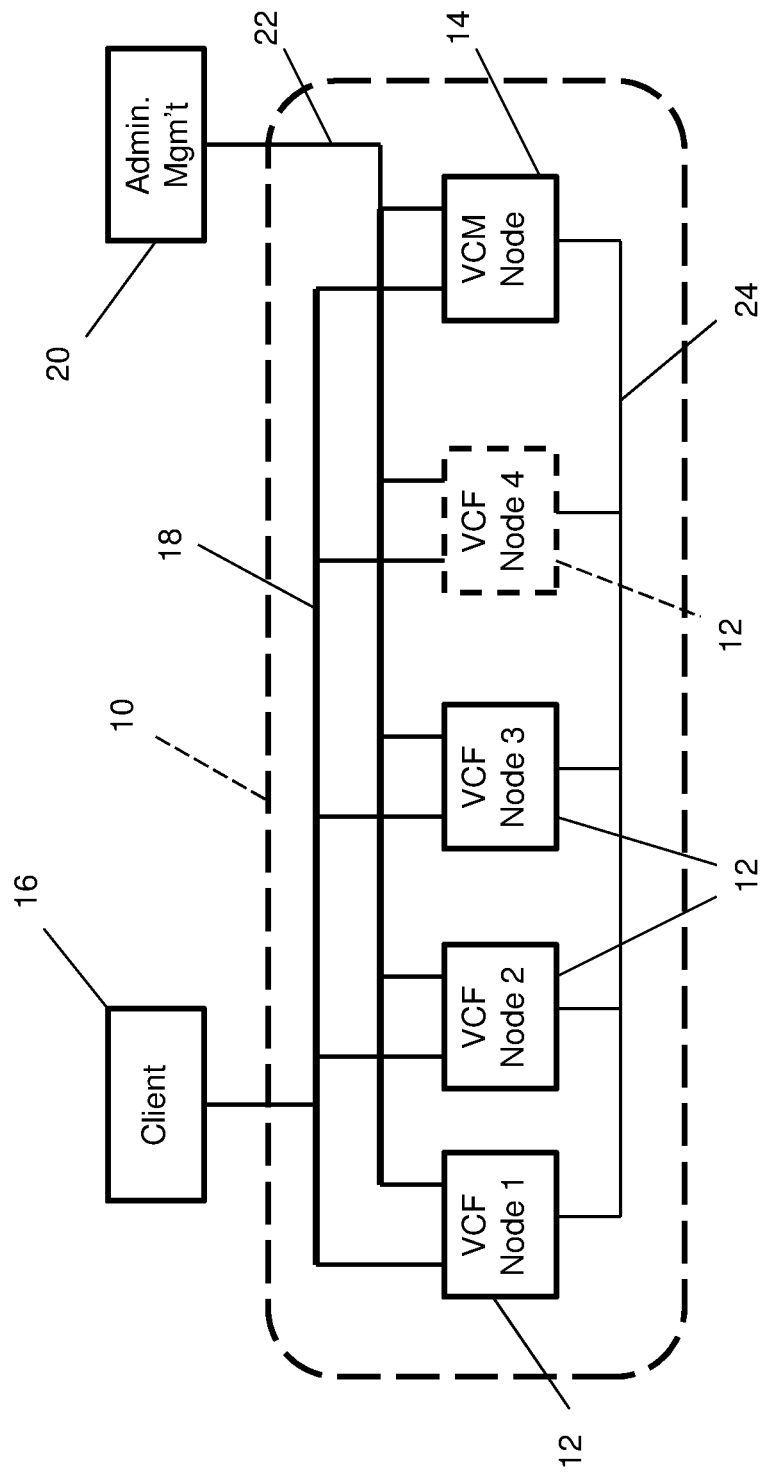
FIG. 1 is a diagrammatic block diagram that illustrates a distributed VSO cluster of the type with which the invention may be employed.

FIG. 1 illustrates an embodiment of a distributed VSO cluster 10 of the type with which the invention may be employed. As shown, the cluster 10 may comprise a plurality of cluster nodes (VCF) 12, four such nodes (Nodes 1-4) being shown in the figure, and a virtual master node (VCM) 14 that acts as a cluster manager. The VCF nodes and the VCM master node may be distributed geographically, physically separated from one another, and interconnected to one or more clients 16 by a data network 18 and to an administrator management node 20 by another network 22. Networks 18 and 22 may be non-secure public networks. The VCM master node 14 may also be connected to the VCF nodes 12 by a private internal network 24 for control and load balancing by the VCM.

Each of the VCF nodes 12 and the master node 14 may comprise virtual machines instantiated and distributed on one or more physical machines in a virtual machine infrastructure or in a cloud, such as provided by AWS. The physical machines may comprise a processor and associated memory embodying executable instructions for controlling the operations of the processor, including virtualization software such as is available from VMware, Inc. or Microsoft, for example, for creating virtual machines and the virtual infrastructure. Cluster 10 may reside in a cloud, as stated, and may be one of multiple interconnected clusters of VMs. Cluster nodes VCF 12 are preferably all be identical nodes that are created from a common OS image with the same configuration and properties and which may execute different instances of the same application. The cluster master node VCM 14 may embody a known virtual scale-out software that monitors via the control network 24 the workload, metrics such as CPU usage, memory demand or disk accesses, and other operating conditions of the VM instances of the VCF cluster nodes, and automatically and dynamically spawns a new VCF node when predetermined limits or rule conditions are reached, or according to a predetermined schedule. For instance, when an application demand and the load on the VMs of the existing VCF cluster nodes experience an increase, autoscale rules may be configured to automatically increase the number of VM instances (VCF nodes) in the cluster scale set of nodes. A new VCF node, such as, e.g., VCF Node 4 in FIG. 1 (shown in dotted lines), that is spawned by the virtual scale-out software in response to the increased demand is preferably created from the same common image that was used to create the other pre-existing cluster nodes 12 so that the new node is identical to the pre-existing nodes. Having identical cluster nodes is desirable for reliable performance and redundancy. As new nodes are created and deployed in the cluster as part of the scale-out, load balancing software may automatically start to distribute traffic to them.

It is important to ensure that cluster nodes and their communications over non-secure networks such as 18 and 22 be secured to protect the organization's data. It is particularly important that any newly created and deployed cluster VCF node be instantiated and deployed in the cluster with trust between the new node and the master node VCM to enable a secure communications channel to be established. A public key infrastructure (PKI) may be used for secure communications with cluster nodes. However, establishing a secure PKI requires a secure exchange of information between nodes, and there is a problem in exchanging encryption keys or other private information over a non-secure public network because a non-secure network exposes non-secured communications to compromise.

As will be described, the invention addresses this problem by affording a process in which initial trust is established between a master node of a cluster and a newly created and deployed cluster node by embedding in the image of the new node a shared secret key that enables establishing an initial secure communications channel between the master node and the new cluster node over which asymmetric keys can be exchanged during deployment to set up a more secure PKI communications channel. In contrast to traditional approaches, this process of the invention does not require any user or administrator intervention to provide credentials for establishing the trust required or to confirm the fingerprint of the new node for setting up the secure PKI communications channel. Traditionally, trust is established between a master source node and a new destination node in a network by an administrator on the master node verifying the fingerprint of the new node to ensure that the new node is the correct destination node, and the new node verifies the credentials provided by the master node. Neither of these is required with the invention. Rather, a process in accordance with the invention is scalable and allows new digital identity certificates, e.g., X.509 certificates, to be generated or imported by the master node automatically and dynamically for use in the PKI encryption protocol, without intervention of a user or administrator.

As will be described more fully below in connection with FIGS. 2A and 2B, in accordance with an embodiment of the invention, to establish initial trust a randomly generated shared secret, such as a random number, may be embedded in the image of the new virtual node (VCF) that will be deployed by the master node VCM. The shared secret in the image is protected by the virtual machine infrastructure, such as from VMware or Microsoft, for example. Since the shared secret is known only to the master-virtual node pair, secure communications can occur using the PSK cipher suite. Using the PSK cipher suite, the new virtual VCF node may request that the master VCM node sign its Certificate Signing Request (CSR). A CSR comprises a block of encoded text that is given to a CA by an applicant when applying for an SSL certificate. The certificate includes information such as the organization's name, domain name, locality and country. It is typically generated by a server on which the certificate will be installed, and includes a public key of a key pair comprising the public key and the private key created by the server. The private key will remain secret and used for encryption and decryption in the PKI. Upon the master node signing the CSR, a certificate chain is established, enabling a PKI to be established.

Figure 2A:
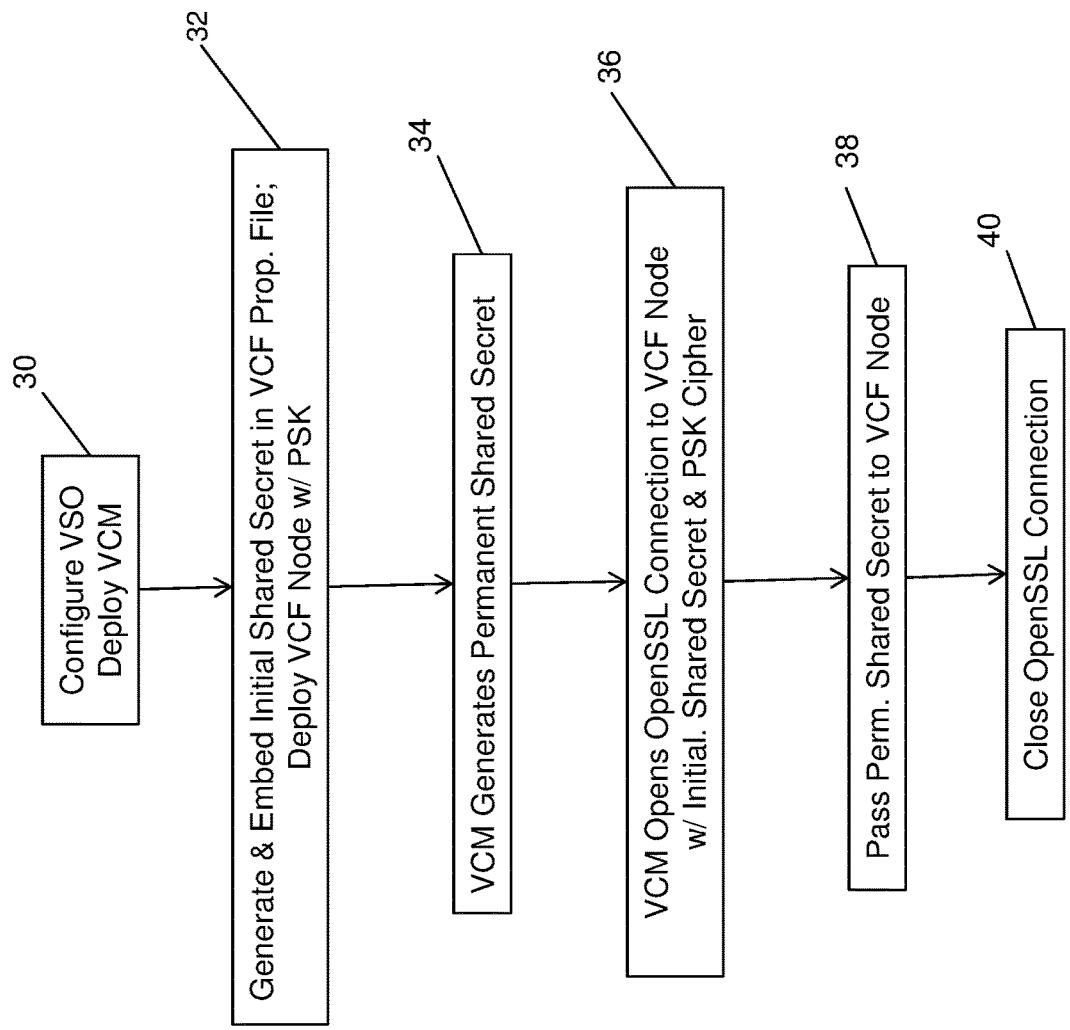
FIGS. 2A and 2B is a diagrammatic view that illustrates a process of deploying and configuring nodes in a VSO cluster, and establishing a chain of trust for secure communications.
Figure 2B:
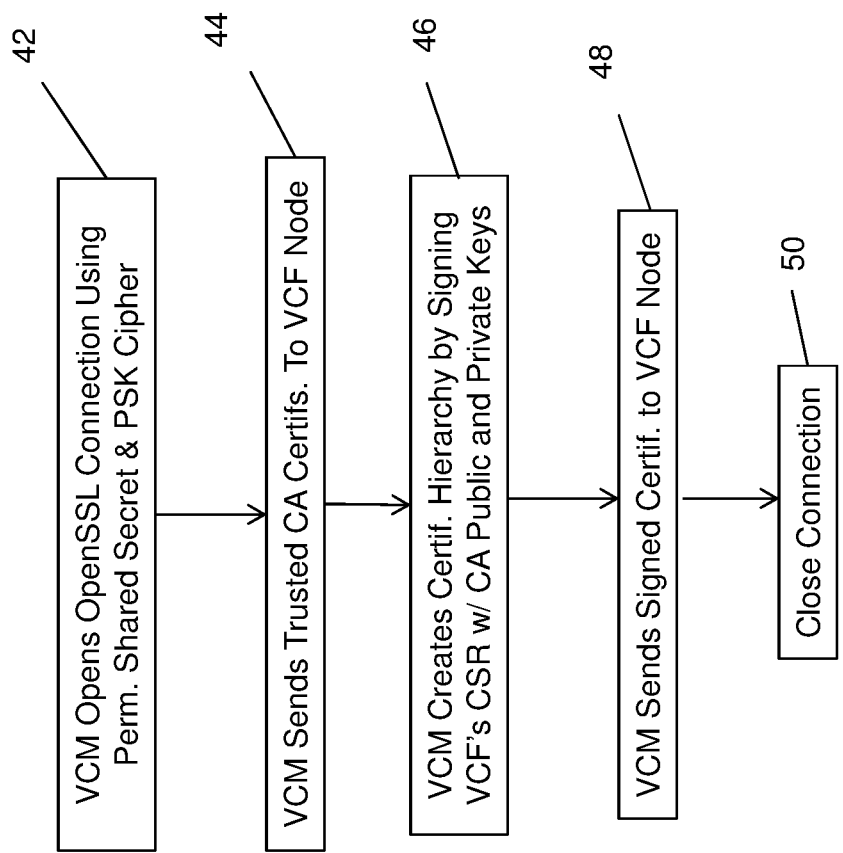

FIGS. 2A and 2B illustrate a process in accordance with the invention for establishing a chain of trust using X.509 certificates. An X.509 digital certificate uses the X.509 public key infrastructure (PKI) standard to verify that a public key belongs to the entity identified in the certificate. It forms the backbone of the SSL encryption protocol.

Referring to FIG. 2A, at 30 an application administrator may begin to configure a VSO by deploying a master VCM node as part of a cluster of a virtual machine infrastructure. At 32, the VCM may generate an initial pre-shared secret, such as a random number, embed it in an OVF (Open Virtualization Format) property file of an image of a VCF node, and deploy the VCF node. This may be either upon creation of a virtual cluster or upon the spawning of a new VCF node of an existing cluster. The initial shared secret is protected by the inherent trust between the virtual machine deployment infrastructure, such as by a vCenter and the virtual machine ESXi host. The initial shared secret is known only to the VCM node and the VCF node.

At a next stage 34 of the process, the VCM may generate another (permanent) shared secret, e.g., another random number. At 36, the VCM may open an OpenSSL connection to the new VCF node using the initial pre-shared secret key and cipher. OpenSSL is a known open source software library of SSL and TLS protocols for computer applications that secure communications over a network. At 38, the VCM may pass the permanent shared secret key (PSK) to the new VCF node over the OpenSSL connection. At 40, the VCM may close the OpenSSL connection before establishing a chain of trust using X.509 certificates, as described in the following sequence, illustrated in FIG. 2B.

Referring to FIG. 2B, at 42 the VCM may open a new OpenSSL connection to the VCF using the permanent shared secret key cipher. At 44 the VCM sends the trusted CA certificates to the VCF. At 46 the VCM may request the new VCF's Certificate Signing Receipt (CSR) and sign the CSR using its own CA public and private keys to create a certificate hierarchy between the VCM and the new VCF. At 48 the VCM sends the signed certificate which includes the entire chain up to the root CA to the VCF node. At 50 the VCM may close the connection.

Using the certificates, the PKI infrastructure can be established. Once the PKI is established, cluster communications including sensitive enterprise data will be secured and protected even though the communications may be over a non-secure network. In the case of a VMware vCenter environment, trusts are established between the vCenter and the ESXi hosts where the VCM and VCF nodes will be deployed. The deployment of the VCF's OVF file will be protected by the SSL connection between the ESXi hosts and the vCenter.

After establishing the initial trust, the initial shared secret may be used later for re-establishing the trust whenever the VCM's certificate expires or changes for other reasons such as a user importing its own certificate.

While the foregoing has been with reference to preferred embodiments, it will be appreciated that changes to these embodiments may be made without departing from the principles of the invention, which are defined by the appended claims.

The invention claimed is:

1. A method of establishing secure communications between virtual machines in a non-secure environment, comprising:

configuring said virtual machines as a virtual machine cluster comprising a virtual cluster master node and a plurality of virtual cluster nodes, said virtual cluster master node and said virtual cluster nodes being connected by a non-secure communications network;

deploying by said virtual cluster master node a new virtual cluster node, said deploying comprising embedding by said virtual cluster master node in an image of said new virtual cluster node an initial pre-shared secret key to establish an initial trust between the virtual cluster master node and the new virtual cluster node;

communicating securely a permanent shared secret key from the virtual cluster master node to the new virtual cluster node using said initial trust, and exchanging public key infrastructure certificates securely between the virtual cluster master node and the new virtual cluster node using the permanent shared secret key to establish mutual trust for secure communications.

2. The method of claim 1, wherein said configuring comprises configuring said cluster to have a virtual scale-out architecture, wherein said virtual cluster nodes have substantially the same configurations and execute different instances of the same application.

3. The method of claim 1, wherein said deploying comprises automatically deploying said new virtual cluster node in response to operating requirements of said cluster.

4. The method of claim 2, wherein said automatically deploying comprises monitoring the operating conditions of said virtual cluster nodes relative to predetermined criteria, and dynamically spawning said new virtual cluster node without user involvement upon said operating conditions deviating from said predetermined criteria by a predetermined amount.

5. The method of claim 1, wherein said communicating said permanent shared key comprises opening a first trusted connection between the virtual cluster master node and said new virtual cluster node using said initial pre-shared secret key; passing said permanent shared secret key to said new virtual cluster node using said first trusted connection; and opening a second trusted connection using said permanent shared secret key for exchanging said public key infrastructure certificates.

6. The method of claim 5, wherein said first and second trusted connections are OpenSSL connections.

7. The method of claim 5, wherein said exchanging said public key infrastructure certificates comprises said virtual cluster master node signing a certificate signing request of said virtual cluster node with a private key of said virtual cluster master node to create a certificate hierarchy between the virtual cluster master node and the virtual cluster node.

8. The method of claim 7 further comprising sending by the virtual cluster master node trusted certificate authority certificates to the virtual cluster node to establish said mutual trust.

9. The method of claim 1, wherein said plurality of virtual cluster nodes are configured from a common object to have the same configurations and properties.

10. The method of claim 1, wherein said configuring comprises configuring said virtual cluster master node to embody and execute virtual scale-out software to create a virtual scale-out architecture.

11. The method of claim 1, wherein said initial shared secret key and said permanent shared secret key comprise random numbers.

12. A computer program product comprising a non-transitory memory having computer executable instructions for controlling the operations of a processor to perform a method of establishing secure communications between virtual machines in a non-secure environment, said method comprising:

configuring said virtual machines as a virtual machine cluster comprising a virtual cluster master node and a plurality of virtual cluster nodes, said virtual cluster master node and said virtual cluster nodes being connected by a non-secure communications network;

deploying by said virtual cluster master node a new virtual cluster node, said deploying comprising embedding by said virtual cluster master node in an image of said new virtual cluster node an initial pre-shared secret key to establish an initial trust between the virtual cluster master node and the new virtual cluster node;

communicating securely a permanent shared secret key from the virtual cluster master node to the new virtual cluster node using said initial trust, and exchanging public key infrastructure certificates securely between the virtual cluster master node and the new virtual cluster node using the permanent shared secret key to establish mutual trust for secure communications.

13. The computer product of claim 12, wherein said configuring comprises configuring said cluster to have a virtual scale-out architecture, wherein said virtual cluster nodes have substantially the same configurations and execute different instances of the same application.

14. The computer product of claim 12, wherein said deploying comprises automatically deploying said new virtual cluster node in response to operating requirements of said cluster.

15. The computer product of claim 14, wherein said automatically deploying comprises monitoring the operating conditions of said virtual cluster nodes relative to predetermined criteria, and dynamically spawning said new virtual cluster node without user involvement upon said operating conditions deviating from said predetermined criteria by a predetermined amount.

16. The computer product of claim 12, wherein said communicating said permanent shared key comprises opening a first trusted connection between the virtual cluster master node and said new virtual cluster node using said initial pre-shared secret key; passing said permanent shared secret key to said new virtual cluster node using said first trusted connection; and opening a second trusted connection using said permanent shared secret key for exchanging said public key infrastructure certificates.

17. The computer product of claim 16, wherein said exchanging said public key infrastructure certificates comprises said virtual cluster master node signing a certificate signing request of said virtual cluster node with a private key of said virtual cluster master node to create a certificate hierarchy between the virtual cluster master node and the virtual cluster node.

18. The computer product of claim 12 further comprising sending by the virtual cluster master node trusted certificate authority certificates to the virtual cluster node to establish said mutual trust.

19. The computer product of claim 12, wherein said plurality of virtual cluster nodes are configured from a common object to have the same configurations and properties.

* * * * *